(12) United States Patent
Kim et al.

(10) Patent No.: US 8,120,587 B2
(45) Date of Patent: Feb. 21, 2012

(54) TOUCH PANEL USING NANO-WIRE

(75) Inventors: Sangwook Kim, Suwon-si (KR);
Youngsoo Park, Seoul (KR);
Changjung Kim, Yongin-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 603 days.

(21) Appl. No.: 12/289,936

(22) Filed: Nov. 7, 2008

(65) Prior Publication Data
US 2009/0309843 A1 Dec. 17, 2009

(30) Foreign Application Priority Data
Jun. 17, 2008 (KR) .................. 10-2008-0057018

(51) Int. Cl.
*G06F 3/041* (2006.01)
(52) U.S. Cl. .................. 345/173; 345/174; 345/176

(58) Field of Classification Search .................. None
See application file for complete search history.

(56) References Cited

U.S. PATENT DOCUMENTS

| 7,645,497 | B2 * | 1/2010 | Spath et al. ............ 345/173 |
| 2008/0100587 | A1 * | 5/2008 | Sano et al. ............ 345/173 |

* cited by examiner

*Primary Examiner* — Muhammad N Edun
(74) *Attorney, Agent, or Firm* — Harness, Dickey & Pierce, P.L.C.

(57) ABSTRACT

Provided is a touch panel using a zinc oxide (ZnO) nano wire. The touch panel may include a first transparent substrate, a first transparent electrode layer on the first transparent substrate, a light transmissive nano wire layer including a plurality of piezoelectric nano wires that may be arranged on the first transparent electrode layer so as to be perpendicular to the first transparent electrode layer, a second transparent electrode layer on the nano wire layer, and a second transparent substrate on the second transparent electrode layer.

12 Claims, 4 Drawing Sheets

TOUCH PANEL USING NANO-WIRE

PRIORITY STATEMENT

This application claims priority under U.S.C. §119 to Korean Patent Application No. 10-2008-0057018, filed on Jun. 17, 2008, in the Korean Intellectual Property Office (KIPO), the entire contents of which are incorporated herein by reference.

BACKGROUND

1. Field

Example embodiments relate to a touch panel, and more particularly, to a touch panel using a zinc oxide (ZnO) nano wire.

2. Description of the Related Art

Touch panels may be a type of input device which may be installed on a front surface display of an electronic apparatus (e.g., personal computers, notebook computers, or portable media players (PMPs)) and which input a predetermined or given order or data to the electronic apparatus by an operation of simply touching the display front surface by using fingers or pens, or an operation of inserting characters or pictures on the front surface display. Recently, as consumer demand for convenience has increased, demand for touch panels has increased accordingly.

For example, touch panels may be classified into resistive overlay, capacitive overlay, infrared beam, surface acoustic wave, integral strain gauge and piezoelectric types, according to their driving method. In a piezoelectric type, a material having a relatively great piezoelectric constant and visible light transmission may be appropriate to a piezoelectric device. In addition, in order to prevent or reduce a substrate from deteriorating when a piezoelectric device is formed on the substrate, the piezoelectric device may need to be formed at the lowest possible temperature. Conventionally, a piezoelectric device may be formed of a PbZrTiO (PZT) thin film or a zinc oxide (ZnO) thin film. In this regard, a PZT thin film may have a relatively high piezoelectric constant, but may have a relatively high annealing temperature and low transmission. In addition, a ZnO thin film may be deposited at a lower temperature and may have higher transmission, but may have a relatively low piezoelectric constant.

SUMMARY

Example embodiments provide a relatively high performance touch panel using a piezoelectric device having higher transmittance and a higher piezoelectric constant, which may be deposited at a lower temperature.

According to example embodiments, a touch panel may include a first transparent substrate; a first transparent electrode layer on the first transparent substrate; a light transmissive nano wire layer including a plurality of piezoelectric nano wires that may be arranged on the first transparent electrode layer so as to be perpendicular to the first transparent electrode layer; a second transparent electrode layer on the nano wire layer; and a second transparent substrate on the second transparent electrode layer.

The piezoelectric nano wire may comprise a zinc oxide (ZnO) nano wire. The touch panel may further comprise an insulating filler between the piezoelectric nano wires. The insulating filler may be formed of $SiO_2$. The first transparent electrode layer may comprise a plurality of transparent electrodes that may be arranged parallel to each other in a first direction. The second transparent electrode layer may comprise a plurality of transparent electrodes that may be arranged parallel to each other in a second direction perpendicular to the first direction.

The light transmissive nano wire layer may comprise a plurality of piezoelectric devices which may include a plurality of piezoelectric nano wires and which may be disposed at intersections between the transparent electrodes of the first transparent electrode layer and the transparent electrodes of the second transparent electrode layer.

The transparent electrodes of the first transparent electrode layer and the transparent electrodes of the second transparent electrode layer may be formed of indium tin oxide (ITO), aluminum zinc oxide (AZO) or indium zinc oxide (IZO). The light transmissive nano wire layer may have a thickness in a range of about 1 to about 10 μm.

BRIEF DESCRIPTION OF THE DRAWINGS

Example embodiments will be more clearly understood from the following detailed description taken in conjunction with the accompanying drawings. FIGS. 1-3C represent non-limiting, example embodiments as described herein.

FIG. 1 is a partial cross-sectional view of a piezoelectric device of a touch panel using a zinc oxide (ZnO) nano wire, according to example embodiments;

FIG. 2 is an exploded schematic perspective view of the touch panel using the ZnO nano wire of FIG. 1; and FIGS. 3A-3C illustrate a method of manufacturing the touch panel using the ZnO nano wire, according to example embodiments.

Figure 1:
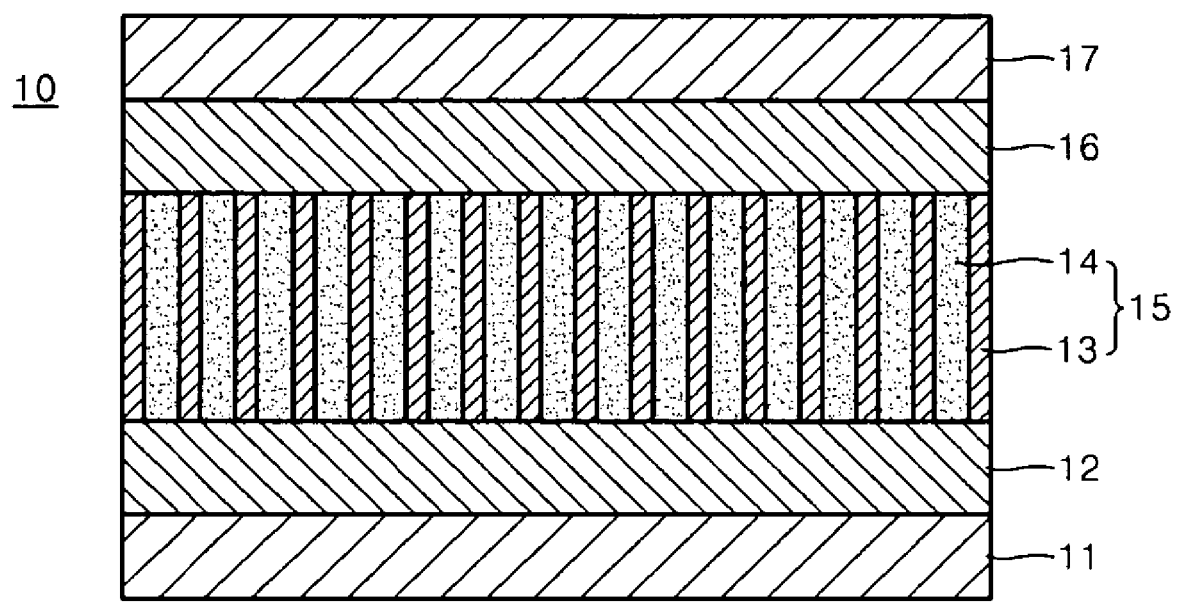

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will be described more fully hereinafter with reference to the accompanying drawings, in which example embodiments are shown. Example embodiments may, however, be embodied in different forms and should not be construed as limited to example embodiments set forth herein. Rather, example embodiments are provided so that this disclosure will be thorough and complete, and will fully convey the scope of example embodiments to those skilled in the art. In the drawings, the thickness of layers and regions are exaggerated for clarity. Like numbers refer to like elements throughout the specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a partial cross-sectional view of a piezoelectric device of a touch panel 10 using a zinc oxide (ZnO) nano wire, according to example embodiments. Referring to FIG. 1, the touch panel 10 may include a first transparent substrate 11, a first transparent electrode layer 12 disposed on the first transparent substrate 11, a light transmissive nano wire layer 15 including a plurality of piezoelectric nano wires 13 that may be perpendicularly arranged on the first transparent electrode layer 12, a second transparent electrode layer 16 disposed on the light transmissive nano wire layer 15, and a second transparent substrate 17 disposed on the second transparent electrode layer 16. Lower portions of the piezoelectric nano wires 13 may be electrically connected to the first transparent electrode layer 12. Upper portions of the piezoelectric nano wires 13 may be electrically connected to the second transparent electrode layer 16.

According to example embodiments, the first and second transparent substrates 11 and 17 may be formed of, for example, a flexible transparent polymer material. The first and second transparent electrode layers 12 and 16 may be formed of a transparent conductive metal oxide material, for example, indium tin oxide (ITO), aluminum zinc oxide (AZO) or indium zinc oxide (IZO).

A ZnO nano wire may be used as the piezoelectric nano wires 13. As described in the description of the related art, because a ZnO thin film has relatively high transmittance, the ZnO thin film may have a lower piezoelectric constant compared to a PbZrTiO (PZT) thin film. However, when ZnO is grown in the form of a nano wire, because ZnO changes to be of a single crystal state, a piezoelectric constant may be significantly increased compared to the case of the ZnO thin film. The piezoelectric constant of the ZnO nano wire may be increased as the height of the ZnO nano wire may be increased compared to the diameter of the ZnO nano wire. However, when the height of the ZnO nano wire is excessively great, the ZnO nano wire may be damaged. Thus, when the ZnO nano wires having a diameter in the range of about 20 to about 100 nm are used as the piezoelectric nano wires 13, the thickness of the light transmissive nano wire layer 15 may be in the range of about 1 to about 10 μm. In example embodiments, ZnO may be an example, but any piezoelectric material that may be grown in the form of a nano wire may be used in example embodiments.

As illustrated in FIG. 1, insulating fillers 14 may be the filler between the piezoelectric nano wires 13 of the light transmissive nano wire layer 15. The insulating fillers 14 may protect the piezoelectric nano wires 13 by removing air gaps between the piezoelectric nano wires 13. For example, the insulating fillers 14 may prevent or reduce the piezoelectric nano wires 13 from being damaged due to continuous pressure generated during use of the touch panel 10. To achieve this, the insulating fillers 14 may be appropriately elastic. In addition, the insulating fillers 14 may be insulated between the first and second transparent electrode layers 12 and 16 in order to prevent or reduce short circuits therebetween. The insulating fillers 14 may be formed of an oxide material, inorganic compound or organic compound. For example, the insulating fillers 14 may be formed of $SiO_2$. However, if the piezoelectric nano wires 13 are solid enough not to be damaged by continuous pressure, the insulating fillers 14 may be omitted.

Figure 2:
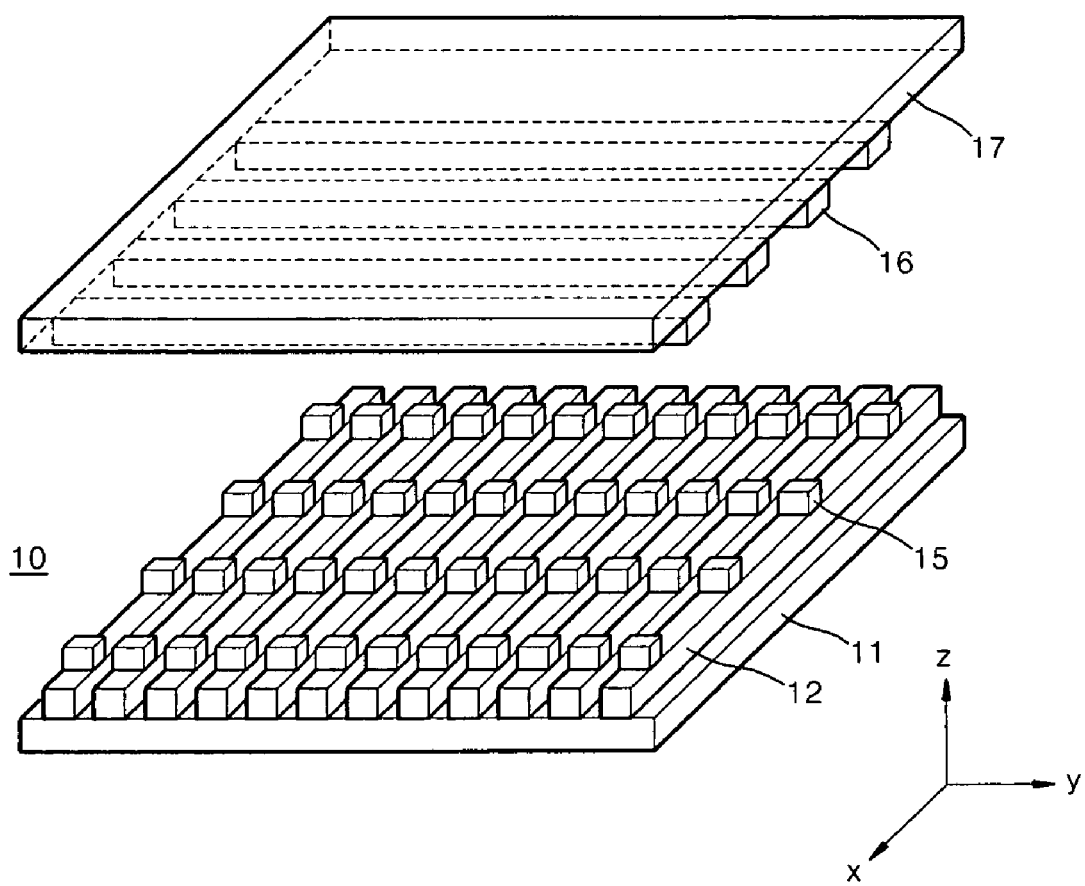

FIG. 2 is an exploded schematic perspective view of the touch panel 10 using the ZnO nano wire of FIG. 1. Referring to FIG. 2, the first transparent electrode layer 12 disposed on the first transparent substrate 11 may include a plurality of transparent electrodes that are arranged parallel to each other in an x-axis direction. In addition, the second transparent electrode layer 16 disposed below the second transparent substrate 17 may include a plurality of transparent electrodes that are arranged parallel to each other in a y-axis direction. Thus, the transparent electrodes of the first transparent electrode layer 12 and the transparent electrodes of the second transparent electrode layer 16 may be almost perpendicular to each other.

As illustrated in FIG. 2, the light transmissive nano wire layer 15 may be divided into a plurality of piezoelectric devices that are two-dimensionally arranged at intersections between the transparent electrodes of the first transparent electrode layer 12 and the transparent electrodes of the second transparent electrode layer 16. As illustrated in FIG. 1, each of the piezoelectric devices may include the piezoelectric nano wires 13 and the insulating fillers 14 between the piezoelectric nano wires 13.

According to example embodiments, in the touch panel 10, when pressure is applied to a predetermined or given piezoelectric device by pressing a surface of the touch panel 10, electricity generated from the predetermined or given piezoelectric device may flow towards a predetermined or given transparent electrode of the first transparent electrode layer 12 and a predetermined or given transparent electrode of the second transparent electrode layer 16, which may be connected to the predetermined or given piezoelectric device. Thus, a pressurized portion of the touch panel 10 may be checked by detecting transparent electrodes through which a current flows from among the transparent electrodes of the first transparent electrode layer 12 and second transparent electrode layer 16.

Figure 3A:
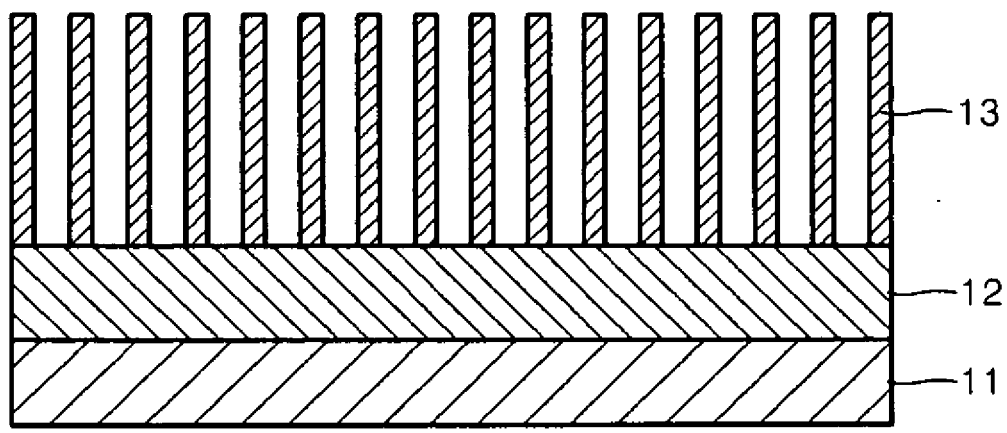
Figure 3B:
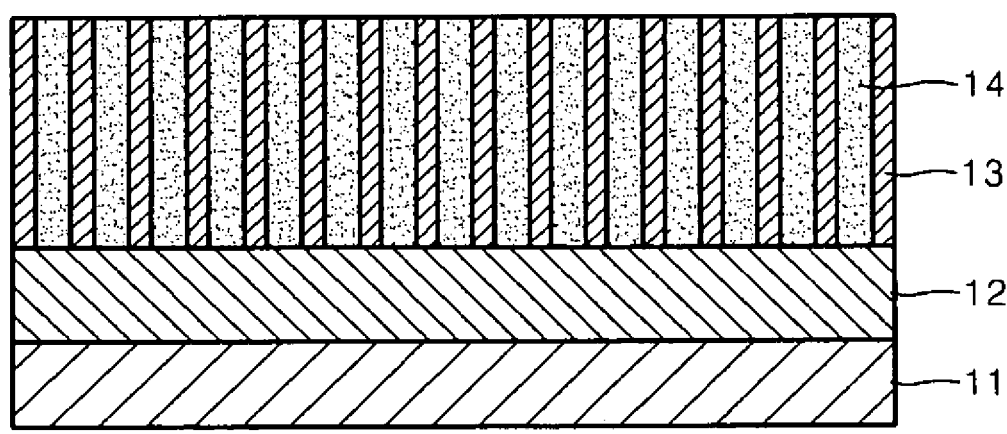
Figure 3C:
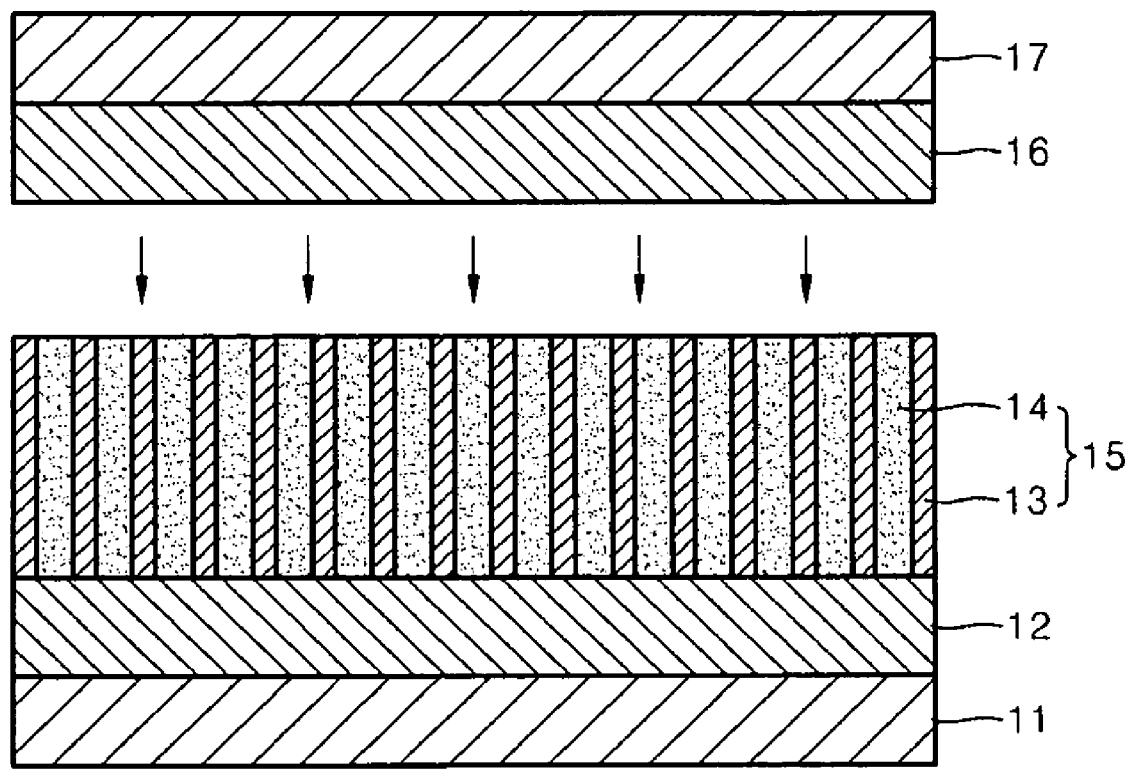

FIGS. 3A-3C illustrate a method of manufacturing the touch panel using the ZnO nano wire, according to example embodiments. Referring to FIG. 3A, the first transparent electrode layer 12 formed of ITO, AZO or IZO may be formed on the first transparent substrate 11. The piezoelectric nano wires 13 may be grown on the first transparent electrode layer 12 so as to be almost perpendicular to the first transparent electrode layer 12. When the piezoelectric nano wires 13 are formed of ZnO, the piezoelectric nano wires 13 may be grown at a relatively low temperature, for example, a temperature equal to or less than about 300 degrees. Thus, damage to the first transparent substrate 11 or the first transparent electrode layer 12 may be prevented or reduced due to heat generated during growth of the ZnO nano wire. Various methods of growing the ZnO nano wire at a relatively low temperature may be already known to one of ordinary skill in the art. For example, the ZnO nano wire may be grown by aqueous solution synthesis, thermal chemical vapor deposition, reaction evaporation, spray pyrolysis, pulse laser deposition, chemical vapor deposition (CVD), sputtering, plasma enhanced chemical vapor deposition (PECVD), atomic layer deposition (ALD), or metal organic chemical vapor deposition (MOCVD).

Referring to FIG. 3B, the insulating fillers 14 may be formed between the piezoelectric nano wires 13. The insulating fillers 14 may be formed of $SiO_2$. The insulating fillers 14 may be formed using, for example, a sol-gel process, which is already known to one of ordinary skill in the art. The insulating fillers 14 may extend higher than the piezoelectric nano wires 13 so as to cover the piezoelectric nano wires 13. In example embodiments, the piezoelectric nano wires 13 may be exposed by planarization, e.g., chemical mechanical polishing (CMP). Thus, the light transmissive nano wire layer 15 may be formed on the first transparent electrode layer 12.

Although patterning is not illustrated, patterning may be performed in order to form patterns of the first transparent electrode layer 12 and patterns of the light transmissive nano wire layer 15, which may be illustrated in FIG. 2. For example, the light transmissive nano wire layer 15 and the first transparent electrode layer 12 may be patterned in an x-axis direction (see FIG. 2) by etching. Only the light transmissive nano wire layer 15 may be patterned in a y-axis direction (see FIG. 2) by etching, and thus, the light transmissive nano wire layer 15 may be divided into the plurality of piezoelectric devices that are two-dimensionally arranged.

Referring to FIG. 3C, the second transparent electrode layer 16 may be formed below the second transparent substrate 17. Although not illustrated, the second transparent electrode layer 16 may also be patterned in a y-axis direction by etching. The second transparent substrate 17 and the second transparent electrode layer 16 may be attached to the light transmissive nano wire layer 15 of FIG. 3B, thereby completing the manufacture of the touch panel 10.

According to example embodiments, because a piezoelectric device having relatively high transmittance and a relatively high piezoelectric constant is used, the performance of a touch panel may be improved. In addition, a ZnO nano wire may be grown at a relatively low temperature, and damage to other components may be prevented or reduced due to heat generated during formation of the piezoelectric device.

While example embodiments have been particularly shown and described with reference to example embodiments thereof, it will be understood by one of ordinary skill in the art that various changes in form and details may be made therein without departing from the spirit and scope of example embodiments as defined by the following claims.

What is claimed is:

1. A touch panel comprising:
a first transparent substrate;
a first transparent electrode layer on the first transparent substrate;
a light transmissive nano wire layer including a plurality of piezoelectric nano wires that are arranged on the first transparent electrode layer so as to be perpendicular to the first transparent electrode layer;
a second transparent electrode layer directly disposed on the light transmissive nano wire layer; and
a second transparent substrate on the second transparent electrode layer.

2. The touch panel of claim 1, wherein the plurality of piezoelectric nano wires are zinc oxide (ZnO) nano wires.

3. The touch panel of claim 1, further comprising:
an insulating filler between the piezoelectric nano wires.

4. The touch panel of claim 3, wherein the insulating filler is formed of $SiO_2$.

5. The touch panel of claim 1, wherein the first transparent electrode layer comprises a plurality of transparent electrodes that are arranged parallel to each other in a first direction.

6. The touch panel of claim 1, wherein the light transmissive nano wire layer has a thickness in a range of about 1 to about 10 µm.

7. A touch panel comprising:
a first transparent substrate;
a first transparent electrode layer on the first transparent substrate;
a light transmissive nano wire layer including a plurality of piezoelectric nano wires that are arranged on the first transparent electrode layer so as to be perpendicular to the first transparent electrode layer;
a second transparent electrode layer on the light transmissive nano wire layer; and
a second transparent substrate on the second transparent electrode layer, wherein the first transparent electrode layer includes a plurality of transparent electrodes that are arranged parallel to each other in a first direction, and wherein the second transparent electrode layer includes a plurality of transparent electrodes that are arranged parallel to each other in a second direction perpendicular to the first direction.

8. The touch panel of claim 7, wherein the light transmissive nano wire layer comprises a plurality of piezoelectric devices including a plurality of piezoelectric nano wires at intersections between the transparent electrodes of the first transparent electrode layer and the transparent electrodes of the second transparent electrode layer.

9. The touch panel of claim 7, wherein the transparent electrodes of the first transparent electrode layer and the transparent electrodes of the second transparent electrode layer are formed of indium tin oxide (ITO), aluminum zinc oxide (AZO) or indium zinc oxide (IZO).

10. The touch panel of claim 7, wherein the plurality of piezoelectric nano wires are zinc oxide (ZnO) nano wires.

11. The touch panel of claim 7, further comprising:
an insulating filler between the piezoelectric nano wires.

12. The touch panel of claim 11, wherein the insulating filler is formed of $SiO_2$.

* * * * *